June 22, 1965      I. J. DAVIS      3,190,019
THREE-DIMENSIONAL DISPLAYS
Filed Sept. 27, 1962
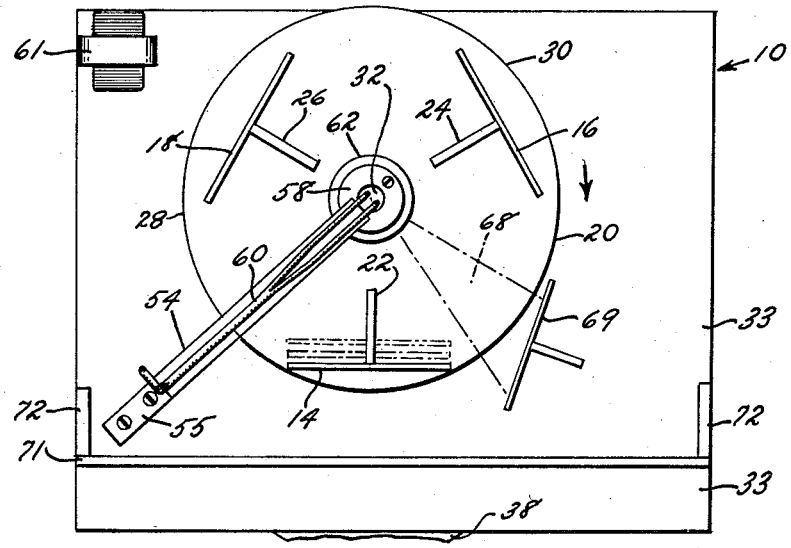
Fig.1
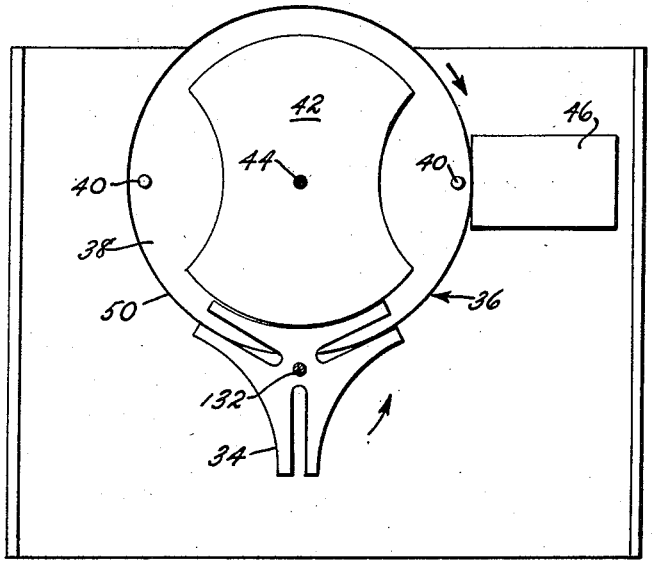
Fig.2
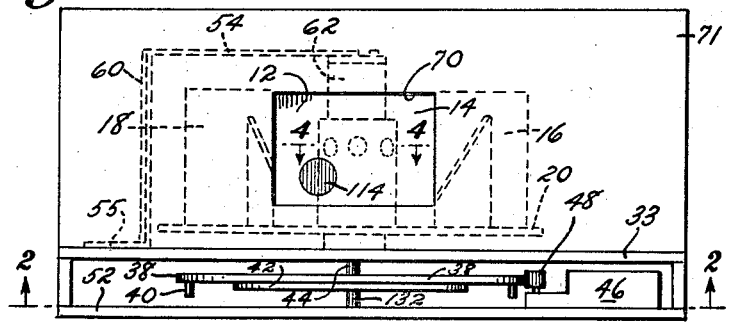
Fig.3
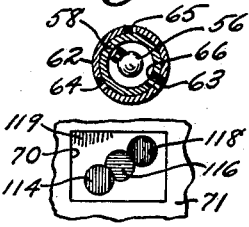
Fig.4
Fig.5

United States Patent Office

3,190,019
Patented June 22, 1965

3,190,019
THREE-DIMENSIONAL DISPLAYS
Irwin J. Davis, 44 Cooper Place, New Haven, Conn.
Filed Sept. 27, 1962, Ser. No. 226,621
4 Claims. (Cl. 40—77)

This invention relates generally to three-dimensional displays, and more particularly to the production of three-dimensional displays from paper prints or by projection from positive transparencies.

The present application presents certain improvements with respect to my application entitled "Three Dimensional Photographic Transparencies," Serial No. 206,660, filed July 2, 1962, wherein there is described a method of segmenting a subject or scene into a plurality of overlapping segments by a sharply defined field of illumination and photographing these segments on distinct and separate sensitized photographic films. The film is processed and the segments printed on transparent mediums and juxtaposed with transparent plastic spacers. The transparencies are static and they are viewed by looking through them.

It is among the objects of the present invention to provide means and methods to utilize pictures and to present them to the view of the user by either reflected or transmitted light, in rapid succession, so that fusion occurs and a three-dimensional effect is produced.

Another object herein is to provide simple apparatus for the above purpose.

These objects and other incidental ends and advantages will more fully appear in the progress of this disclosure and be pointed out in the appended claims.

In the drawings, in which similar reference characters designate corresponding parts throughout the several views:

FIGURE 1 is a fragmentary top plan view of an embodiment of the invention.

FIGURE 2 is a sectional view as seen from the plane 2—2 on FIGURE 3.

FIGURE 3 is a front elevation.

FIGURE 4 is a sectional view as seen from the plane 4—4 on FIGURE 3.

FIGURE 5 is a fragmentary front elevational view illustrating the three-dimensional effect.

In accordance with the invention, the apparatus, generally indicated by reference character 10, comprises broadly: a plurality of pictures 12 and means 20 to consecutively expose the pictures to the user.

As best seen in FIGURE 1, the individual pictures are indicated by reference characters 14, 16, and 18. The prints or pictures 14, 16, and 18 are positioned by supports 22, 24, and 26, respectively, on a rotating turntable 28 of circular shape. Picture 14, representing the front of the subject or composite scene, is mounted upright close to the rim 30 of the turntable and perpendicular to the radius from axis 32. Picture 16, representing the middle section or intermediate zone of the subject or composite scene is located at 120° from picture 14 and spaced inward from rim 30 a greater distance than picture 14 (for example, ½ inch in the case of a 4" x 5" print). Picture 18, representing the last or rear segment of the subject or composite scene is arranged at 120° from the pictures 14 and 16 and spaced inward from rim 30 a greater distance than picture 16 (for example, ½ inch closer to axis 32 than picture 16).

The turntable 28 is rotatably mounted on the platform 33 and keyed to axle 132, which is keyed to the slotted wheel 34 of the well-known Geneva movement 36, providing for intermittent movement of the axle 132. The Geneva movement may have the driving wheel 38 with driving pins 40 and locking plate 42. Wheel 38 and plate 42 are integral and rotate about the shaft 44, and wheel 38 may be driven in any suitable manner, for example by electric motor 46 whose driving member 48 may frictionally engage the edge 50 of wheel 38. The shaft 44 is journalled in platform 33 and the base 52.

Supported in a stationary manner above the turntable 28 by the bracket 54 is the source of illumination 56 located within the stationary housing 58. Bracket 54 is of generally L-shape, and is attached at 55 to the upper surface of platform 33. The source of illumination 56 may be a projection-type bulb supplied by conductors 60 from transformer 61.

Secured to the turntable 28 and projecting upward therefrom, and surrounding the housing 58, is the cylindrical shutter 62 which has three orifices 63, 64, and 65, which coact with the single orifice 66 in the housing 58. In the position of the parts shown in FIGURES 1–4, inclusive, in the drawings, a beam of light 68 is cast upon the reflector 69 which reflects the light back upon the particular picture disposed opposite the viewing frame 70 in the front panel 71 which is held erect by supports 72. The action of the shutter 62 is such that illumination is cast upon the pictures 12 when they are at rest opposite the frame 70. It will be understood that all parts except the viewing frame 70 are enclosed, such enclosures not being shown in the drawings for clarity in the disclosure, the frame 70 permitting the viewing of one picture at a time, as they are rotated by the turntable.

In operation and use the three pictures 14, 16, and 18 merge into one three-dimensional image, the persistence of vision of the eye on which motion pictures and television are also based being utilized. The turntable is moved with an intermittent motion, so that each print or picture is in the viewing frame for approximately $\frac{1}{16}$ of a second or less. As the picture stops in the viewing frame, the light is cast thereupon by the shutter which is synchronized to the intermittent motion. The pictures are spatially extended, juxtaposed and in register in the eye of the viewer, giving the illusion of depth. This is schematically illustrated in FIGURE 5, where the images 114, 116, and 118 may indicate three balls in a spaced or perspective arrangement. The unexposed black areas 119, outside the field of illumination, aid this effect.

In another use of the invention, positive unmasked transparencies are made from the negatives obtained in the manner set forth in said co-pending application. These transparencies are projected in sequence by a known regular motion picture projector on a rotating turntable with a reflective material in place of the prints and the motion of the turntable synchronized to the motion of the projector as described hereinabove. The transparency representing the front of the subject or composite scene nearest the viewer is projected on the screen nearest the rim of the turntable, and the transparency representing the rear of the subject is projected on the screen closest to the axis of the turntable, with the intermediate transparency projected upon a screen which is radially positioned to come between the other two screens. As will be apparent where a greater number of segments (spaced pictures) are desired, this may be done, it being necessary only to make the requisite change in the Geneva movement and the shutter to correlate to the new number of pictures in the repeating cycle.

While I have shown a simple light source with a mechanical shutter arrangement, an optical system may be incorporated to more fully utilize the beam of light.

In a modification, the pictures 12 may be in the form of positive transparencies which are illuminated from the rear by light being transmitted through them rather than being reflected from them.

In the said co-pending application, one of the problems encountered is the masking of the unexposed areas. In the present invention, this condition is avoided because the pictures are merged in the eye and the black areas 119 actually aid the illusion.

I wish it to be understood that I do not desire to be limited to the exact details of construction shown and described, for obvious modifications will occur to a person skilled in the art to which the present invention relates.

I claim:

1. In a display, a plurality of pictures, each of said pictures being a representation of a portion of a composite scene as viewed at a different distance from the eye of an observer, the pictures being tangentially located with respect to a central axis at varying radial distances thereto, and means to sequentially expose to the view of the observer each of the pictures.

2. Apparatus for the presentation of three-dimensional displays comprising: a turntable having a central axis of rotation, an upper surface and a lower surface; a plurality of pictures positioned upon the upper surface of said turntable tangentially from said central axis and at varying radial distances with respect thereto, powered means connected to the lower surface of the turntable providing intermittent movement for the same illuminating means rotatively secured to the upper surface of the turntable to provide a beam of light during the dwell period of the intermittent movement of the turntable, directed to a predetermined location; and means to allow visual viewing of the pictures during the dwell of the intermittent motion, the plurality of pictures being varying representations of a scene, the intermittent motion so timed to provide a three-dimensional illusion.

3. Apparatus according to claim 2, in which the intermittent motion powered mechanism comprises a motor driving a Geneva movement which includes a slotted wheel, the slotted wheel being rotatively keyed to the axis of the turntable.

4. Structure according to claim 2, in which the illuminating means comprises: a fixed inner light housing source, an outer light housing secured to the turntable and having a plurality of light orifices operatively positioned with respect to the pictures, the inner and one of the outer orifices aligning during the dwell of intermittent motion to allow a beam of light to pass out of the housings, and a mirror positioned adjacent to said turntable, directing the beams of the light serially upon said pictures.

References Cited by the Examiner

UNITED STATES PATENTS

| 1,782,834 | 11/30 | Wlodarski | 40—77 |
| 2,134,150 | 10/38 | Schmidt | 40—77 |
| 2,361,390 | 10/44 | Ferrill | 40—28 X |

FOREIGN PATENTS

| 521,035 | 3/55 | Italy. |
| 131,122 | 4/29 | Switzerland. |

EUGENE R. CAPOZIO, *Primary Examiner.*

JEROME SCHNALL, *Examiner.*